3,365,301
PROCESS FOR MAKING FRIED CHIPS
Samuel P. Lipoma, Delano, and Harley E. Watkins, Bakersfield, Calif., assignors to Lipoma Electronics Company, Delano, Calif., a copartnership
Filed Mar. 25, 1964, Ser. No. 354,564
7 Claims. (Cl. 99—100)

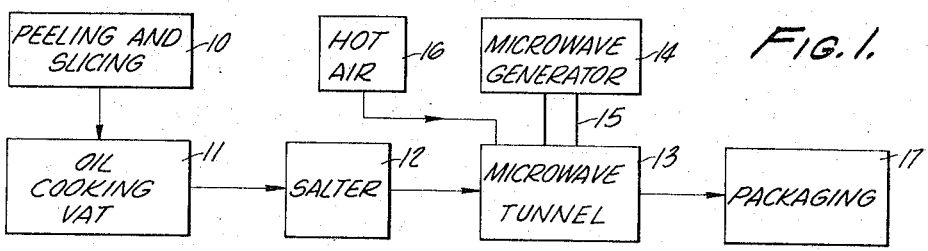
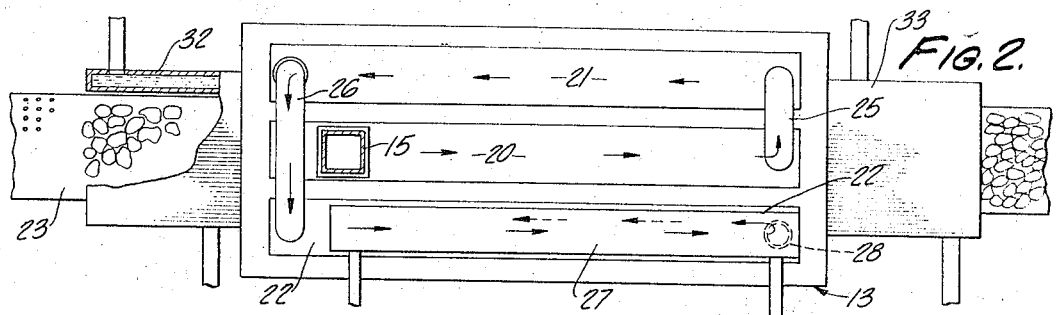
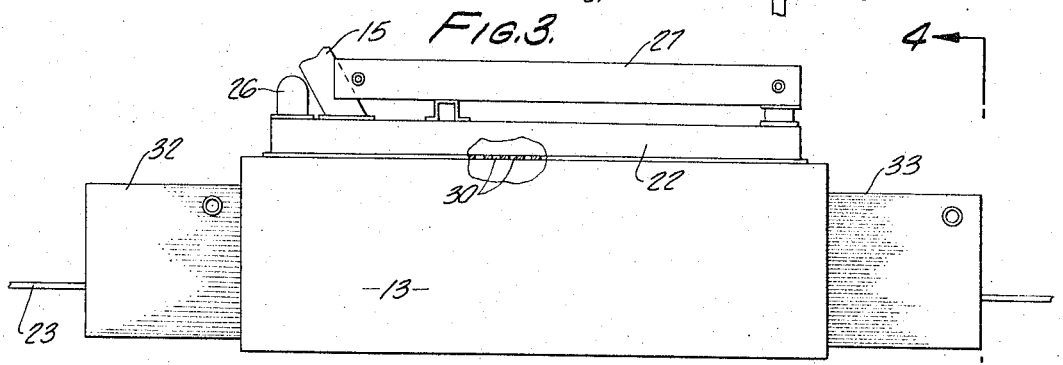
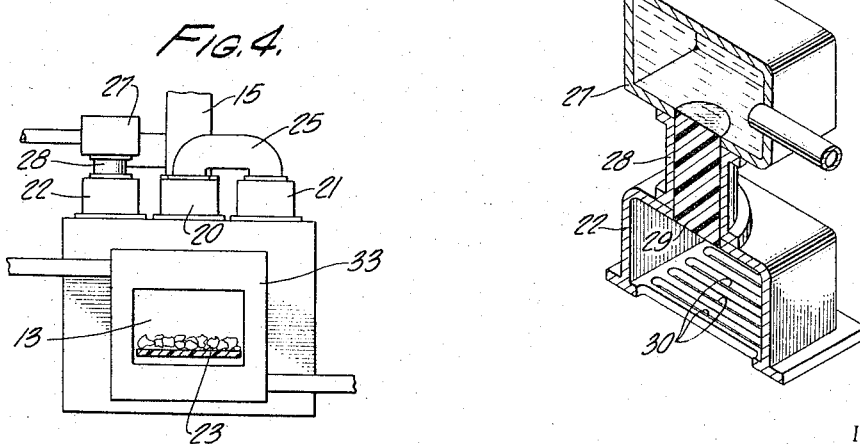
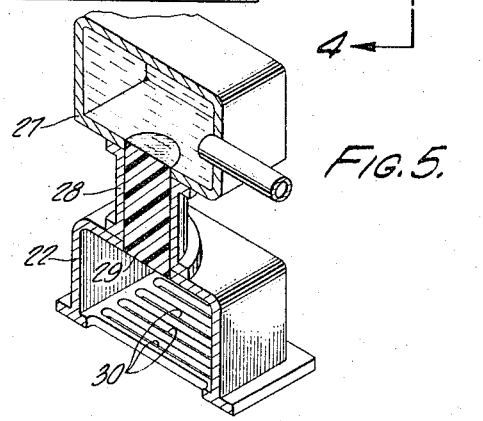
INVENTORS.
SAMUEL P. LIPOMA
HARLEY E. WATKINS
BY
ATTORNEYS United States Patent Office 3,365,301
Patented Jan. 23, 1968

ABSTRACT OF THE DISCLOSURE

Sliced potatoes are partially cooked in a hot oil bath from which they are removed prior to any substantial browning and transferred to a microwave chamber wherein the slices are heated internally by microwave energy to remove moisture therefrom in the presence of a hot air stream which passes through and carries such moisture out of such chamber.

This invention relates to the processing of foods and has particular reference to a novel process and apparatus for the production of snack-type food items such as potato chips and the like.

In the normal process for production of potato chips, raw or blanched potato slices are immersed in a fatty composition comprising an edible vegetable oil or animal fat at a temperature of 350°–390° F. The slices are fried in the hot fatty material for several minutes during which period most of the water in the slices (fresh potatoes contain approximately 85% moisture) is released and the oil or fat is absorbed into the potato slices. The finished potato chips contain from 20–50% oil or fat and less than about 5% moisture. A major problem in the production of potato chips is the desirability of a uniformly light colored product with a sufficiently low moisture content. Heretofore, the attainment of this objective has been extremely difficult and often impossible, due primarily to variations in the raw potatoes utilized and the inability to carefully control cooking conditions. An important object of the present invention is, therefore, to provide a novel process and apparatus for the production of potato chips having a uniformly light color.

The major contributing factor to the problem of producing potato chips of the required light and uniform color is the sugar content of the raw potatoes. Potatoes contain from less than ½% sugar to, in some cases over 3% sugar and during the frying operation, the sugar tends to caramelize, producing undesirable darkening. Heretofore, the potato chip industry has directed its efforts in attempting to solve this problem to the obtaining of potatoes with the lowest possible sugar content. This has brought about other problems in providing special storage facilities, special growing techniques and special pre-treatments, and in some cases with some potato varieties, these efforts have failed to produce the desired results. Accordingly, it is a further object of the present invention to provide a process for the production of uniformly light-colored potato chips of any desired oil content from potatoes of varying sugar contents without utilizing special storage, growing or pre-treatment techniques.

A further object of the present invention is to provide a continuous process for the production of potato chips, other potato products such as shoe strings, french fries and like snack items, such as corn chips, the process involving novel means for controlling the color, moisture and oil content of the finished product.

Other objects and advantages of the present invention it is believed will be readily apparent from the following detailed description of preferred embodiments thereof when read in connection with the accompanying drawings.

In the drawings:
FIGURE 1 is a flow sheet illustrating a preferred form of the process of the present invention.
FIGURE 2 is a top plan view of a microwave tunnel useful in the process illustrated in FIGURE 1.
FIGURE 3 is a side view of the same.
FIGURE 4 is an end view taken substantially as indicated by the arrows 4—4 in FIGURE 3.
FIGURE 5 is a perspective illustrating details of the tunnel shown in FIGURES 2–4.

Briefly, the present invention comprehends within its scope the discovery that electromagnetic waves can be used to supplement the cooking of the potato slices or other snack food raw material in the hot oil or fat and that the cooking or frying step in the hot oil or fat can be controlled and carried out to a point short of visible caramelization of the sugars, yet it can be carried out to a degree sufficient to produce the desired final oil content, with the final cooking being accomplished by means of the electromagnetic waves, without significant color change occurring during the exposure to such wave energy. Preferably, the process of the present invention is carried out continuously by first partially cooking in the hot oil or fat to the desired final oil content, but short of any substantial color change and then completing the cooking to the desired moisture content and degree of crispness by exposure of the partially cooked chips to microwave energy. Alternately, the steps may be reversed, utilizing the microwave heating steps first, followed by the cooking in hot oil or fat.

Referring now to the drawings, the preferred process of the present invention as applied to the production of potato chips is illustrated in the flow sheet of FIGURE 1. Thus, the potatoes are first peeled and sliced at 10 in the usual manner. If desired, the slices may be washed to remove surface starch, but this is not essential and in fact it is preferred not to wash the slices so that the maximum possible solids content is retained in the product. The slice thicknesses may vary within relatively wide limits in accordance with standard practice. For conventional potato chips, thicknesses of 0.05–0.065 inch are suitable, with thicknesses of about 0.075 inch for the "dip" type of chips. The peeled and sliced potatoes are fed continuously into a conventional cooking vat or potato chip cooker 11 provided with the usual means for continuous movement of the slices through the hot oil. The slices are partially cooked under predetermined conditions of time and temperature, depending upon the sugar content of the raw slices, the specific gravity thereof, the slice thickness and the desired final color and oil content. Cooking temperatures can vary between about 215° and about 450° F. with cooking times varying from one or two seconds to five minutes or more. Preferred ranges are 275°–375° F. and 1–4 minutes. Potatoes of relatively high sugar content are cooked at relatively low temperatures and vice versa. When cooking is accomplished at a higher temperature, the cooking time is lessened. The lower temperatures are conducive to higher oil contents in the final product, relatively low oil contents being produced under the higher temperature, short-time conditions. In this partial cooking step the water content of the slices is materially reduced, but to an amount less than that required in the final product.

The partially cooked potato slices are then exposed to the electromagnetic waves under conditions to provide the final cooking to the desired degree of crispness. As shown in FIGURE 1, preferably the slices are first fed from the cooking vat 11 to a salter 12 where the desired salt and/or other powdered flavoring is applied, following which the slices are fed through the microwave chamber or tunnel 13, described in detail below. The microwave chamber 13 is irradiated with microwave energy developed by the microwave generator 14, of either the klystron or magnetron type and conveyed to chamber 13 by wave guide 15. The moisture developed in chamber 13 is removed by a stream of hot air fed thereto from a hot air supply 16. Alternately, the oil cooking vat and microwave chamber may be combined in a single piece of apparatus wherein the microwave energy is applied to the oil-immersed slices near the exit end of the apparatus.

Preferably, a microwave frequency of about 910 megacycles per second is utilized, but this may be varied within a wide range, 755–985 megacycles per second being a practical range. The amount of microwave energy applied is sufficient to complete the cooking of the chips and to remove moisture from the chips to the desired final moisture content of less than about 5%, preferably less than 3%. Other forms of electromagnetic energy than microwave heating may be employed such as, for example, a heat induction coil or a tuned capacitance such as dielectric heating, especially where applied to the potatoes prior to cooking in the oil.

The finished chips are then bagged or otherwise packaged in the usual manner as indicated at 17.

The microwave tunnel or chamber 13 includes three apertured wave guide sections 20, 21, and 22, each above an endless moving belt 23 conveying the potato chips through the chamber. The microwave energy is introduced into one end of section 20 through a wave guide section 15 which communicates section 20 with the microwave energy source. The other end of section 20 is communicated by wave guide section 25 to one end of section 21 having its other end communicating with one end of section 22 via a wave guide section 26, the other end of section 22 being suitably coupled electromagnetically to a water load microwave energy absorber 27 (FIGURE 5) via a wave guide section 28 having a diaphragm 29 of microwave-permeable material such as for example Teflon plastic (Du Pont polytetrafluoroethylene) for allowing passage of energy therethrough but yet preventing the escape of water into the wave guide section 22.

Each of the wave guide sections 20, 21, 22 has its lower flat wall provided with a series of rectangularly slotted or apertured portions 30 (FIGURE 5) each having its major axis extending transversely with respect to the direction of belt travel such that energy may escape through such apertured portions and generally uniformly irradiate the potato chips on the belt.

It will thus be seen that as the microwave energy progressively moves through the sections 20, 21, 22 in that order some of the energy escapes for useful purposes through the apertured portions 30 with the remaining energy being absorbed by heating the water in water load absorber 27 through which cooling water continuously flows. Some of the radiation energy escapes through the open ends of the chamber and for that reason energy absorbing means in the form of water jackets 32, 33 are preferably provided at the chamber ends as generally a prolongation of the chamber. These water jackets 32, 33 are each generally rectangular in cross-section, of radiation permeable material, extend around the belt and have cooling water continuously passing through the same. Additionally metal screen material acting as a shield or impermeable barrier for microwave energy may be used to close the ends of the absorber jackets with an opening therein only sufficiently large to allow passage of the belt with the potato chips thereon.

Preferably the potato chips are salted as indicated in FIGURE 1 prior to entering the chamber 13 because then the chips, being of greater electrical conductivity, enhance the overall efficiency of the microwave cooking process, i.e., less microwave energy is required to be produced in the energy source.

As the potato chips are being heated in chamber 13 their water content is reduced. Means are provided as indicated in FIGURE 1 to sweep the resulting moisture from the chamber. Such means may include a separate hot air duct system that serves to direct a forced stream of hot air into one end of chamber 13 to remove moisture therefrom. Such duct system as illustrated may include the apertured wave guide elements themselves with the moisture-removing air passing through the apertured portions 30 and then onto the potato chips. In either case the flow of hot air is sufficient in volume and temperature to exhaust the vapors without any substantial condensation thereof. The air need not be hot, especially if condensation is otherwise avoided, and other inert gases may be used.

The heating or cooking of the potato chips in chamber 13 is controlled as, for example, by controlling the amount of electromagnetic wave energy supplied at the klystron or magnetron, as the case may be, using conventional klystron or magnetron output control means or by using means controlling the speed of the belt and hence the time of exposure of the potato chips to the microwave energy.

The tunnel itself may, for example, have an overall length of twelve feet, eight feet of which may be termed the active length with a water jacket extending two feet from each end of the active length.

In some forms of the present invention microwave energy may be used in the initial cooking of the potato chips in the oil vat followed by microwave heating of the potato chip after removal from the oil vat. In this initial cooking the potato chip is heated internally by the microwave energy to expel moisture contained therein with fat or oil absorption taking place at a more uniform rate. In such initial cooking the potato chips instead of being immersed in a large deep vat or tank-type cooker may be in a shallow tank or tray with a smaller volume of fat or oil being required. This smaller volume of fat or oil is maintained at lower temperatures than would otherwise be the case thereby minimizing greatly the deterioration of the oil or fat occasioned otherwise by oxidation, polymerization and hydrolysis of the fat molecules into its glycerol and fatty acid fractions. Also such microwave cooking in lower temperature oils minimizes the deleterious effects of metal containers on the oil or fat which otherwise is at higher temperatures.

The following specific examples illustrate the process of the present invention, but it is to be understood that the invention is not to be limited to the specific details thereof.

EXAMPLE 1

A quantity of russet Burbank potatoes having a sugar content of 2.2% and a specific gravity of 1.08 were peeled, sliced to a thickness of 0.055 inch and rinsed in cool water. A one-pound control sample of the slices was cooked in cotton seed oil at a temperature of 365° F. for 2 min., 22 sec. The finished potato chips were very dark in color because of excessive caramelization of the sugar content and were therefore not considered to be of commercial, marketable quality. The finished chips contained 1.4% water and 37% oil.

A one-pound sample of slices from the same lot of potatoes was salted and then cooked in 365° F. oil for a period of 2 min., 5 sec. The partially cooked potato slices contained slightly more than 4% water and 33% oil. The color of the partially cooked potato slices was light and much more desirable than the control sample. The partially cooked slices were then introduced into the microwave apparatus 13, which was operated at 910.3 megacycles per second, and conveyed through the chamber on the belt conveyer 23. There was a continuous flow of warm air through the chamber which removed any accumulated moisture. The partially cooked slices were in the microwave chamber for a period of 1 min., 24 sec. The cooked potato chips contained 1.3% water and 33% vegetable oil, were completely cooked, crisp, and it must be particularly noted that the color of the finished product was highly desirable since it was much lighter than the control sample.

Another one-pound sample of potato slices from the same lot of potatoes was cooked in 335° F. oil for a period of 3 min. The lower temperature and slightly longer cooking period produced a partially cooked potato chip containing 36% vegetable oil and 5% water. The partially cooked slices when cooked at the lower temperature, had a much lighter color than either the control or the partially cooked slices when removed from the 365° F. oil. Also, the lower temperature in the cooking oil allowed the potato slices to absorb more oil. The partially cooked slices were salted and then fed through the apparatus 13 over a period of 1 min., 31 sec. The finished chips contained 36% oil and 1.2% water and were highly desirable as a marketable potato chip because they were more crisp, much lighter and hence more desirable in color.

EXAMPLE 2

Further illustrating the process of the present invention 16 pounds of Idaho russett potatoes having a sugar content of 2.7% and a specific gravity of 1.088 were held in water at about 60° F. for several hours and then peeled and sliced to a thickness of 0.061 inch. No rinsing of the slices was done prior to cooking.

A one-pound control sample of the slices was cooked in cotton seed oil at a temperature of 365° F. for 2 min., 42 sec. The cooked chips contained 36% oil and 1.2% water, and were completely unsatisfactory from a marketable standpoint, being very dark in color (No. 10 on the Potato Chip Institute International Color Chart).

As a further control, a one-pound sample of the slices was passed through the microwave apparatus 13, the residence time being 6 min., 58 sec. The slices were fully cooked, white in color and had a water content of 1.72%.

A number of additional one-pound samples were processed in accordance with the process of the present invention, by first partially cooking in hot cotton seed oil and then exposing the partially cooked slices to the microwave energy as described above in Example 1. The data and results are set forth in Table I, samples Nos. 1 and 2 in the table representing the two above-described control samples. In each of samples Nos. 3–10, there was no discernible change in color of the chips between the time of completion of the oil cook and completion of the microwave heating, and the oil content remained the same. It is to be noted that all of Samples 3–10 were of commercially-accepted color. Color Nos. from 1–4 are light golden colors, No. 1 being almost white.

TABLE I

| Sample No. | Oil Cook | | | | | Microwave Heating | | | Results—PCI Color Chart No. |
|---|---|---|---|---|---|---|---|---|---|
| | Time | | Temp., °F. | Moisture Content, percent | Oil Content, percent | Residence Time | | Water Content, percent | |
| | Min. | Sec. | | | | Min. | Sec. | | |
| 1 | 2 | 42 | 365 | 1.2 | 37 | | | | #10 |
| 2 | | | | | | 6 | 58 | 1.72 | White |
| 3 | | 14 | 345 | 22 | 18 | 5 | 21 | 0.31 | 2-3 |
| 4 | 1 | | 350 | 19 | 21 | 4 | 47 | 0.22 | 3-4 |
| 5 | 2 | 55 | 340 | 9 | 29 | 3 | 33 | 0.62 | 2-3 |
| 6 | 3 | 10 | 335 | 7 | 34 | 3 | 25 | 0.40 | 2-3 |
| 7 | 3 | 18 | 345 | 5 | 32 | 2 | 45 | 0.51 | 3-4 |
| 8 | 3 | 15 | 330 | 4 | 36 | 2 | 30 | 0.30 | 3-4 |
| 9 | 3 | | 330 | 6 | 38 | 2 | 50 | 0.92 | 1-3 |
| 10 | 4 | 10 | 305 | 6 | 44 | 2 | 40 | 0.75 | 1-2 |

EXAMPLE 3

Further examples were carried out using Kennebec variety potatoes having a sugar content of 3.1% and a specific gravity of 1.072. Ten pounds were peeled and sliced to a thickness of 0.052 inch. A control sample was cooked to completion in cotton seed oil at a temperature of 335° F., the product having a moisture content of 2.1% and being very dark in color, between 8 and 10 on the PCI chart. A number of one-pound samples were processed in accordance with the present invention as described above in Example 1 with the data and results as shown in Table II, the color and oil content being the same after the oil cooking and after the microwave heating.

TABLE II

| Sample No. | Oil Cook | | | | | Microwave Heating | | | Results—PCI Color Chart No. |
|---|---|---|---|---|---|---|---|---|---|
| | Time | | Temp., °F. | Moisture Content, percent | Oil Content, percent | Residence Time | | Water Content, percent | |
| | Min. | Sec. | | | | Min. | Sec. | | |
| 1 | 2 | 10 | 280 | 7 | 38 | 3 | 50 | 1.75 | Light 1-2 |
| 2 | 3 | 50 | 245 | 9.5 | 45 | 3 | 45 | 2.1 | 1-3 |
| 3 | 6 | 30 | 220 | 8.5 | 52 | 4 | 50 | 2.0 | 1-2 |
| 4 | 1 | 30 | 380 | 5.2 | 24 | 3 | 45 | 2.1 | 2-5 |
| 5 | 1 | 5 | 420 | 8 | 20 | 4 | | 1.9 | 2-5 |
| 6 | 1 | | 450 | 5 | 17 | 4 | | 1.7 | 2-5 |

From the above description and specific examples, it will be apparent that the present process produces potato chips of excellent quality, without the necessity for special growing or storage techniques or for the use of pre-treatments designed to reduce the sugar content. Further, the process permits the oil content of the product to be varied within wide limits as may be desired to suit special requirements, such as, for example, in the production of a low-oil, low calorie product. It is to be noted that the process is not limited to the production of potato chips, but may be adapted to the production of other potato products, corn products, nut products and, in general, snack items of the type which require frying or cooking in deep fat.

Having fully described our invention, it is to be understood that we do not wish to be limited to the details set forth, but our invention is of the full scope of the appended claims.

We claim:

1. The method of preparing snack-type fried chip products comprising the steps of cooking said chip products in a hot oil bath, removing the chip products from the oil bath prior to development of any substantial browning and crispness of the chip products, subsequently heating the interiors of the chip products to a greater extent than the exteriors and concomitantly driving internal moisture therein to the exterior surfaces thereof by injecting into the chip products a controlled amount of microwave energy for a predetermined time, and directing a flow of at least partially dry hot gas in contact with exterior surfaces of the chip products and thereby absorbing into the gas and carrying away the outwardly-driven moisture, whereby residual moisture in the cooked chip products is removed to render said chip products crisp without substantial change in color.

2. A process for the production of a sugar-containing, snack-type fried chip product, comprising the successive steps of: deep frying produce by immersion in a hot fatty composition in a range of 215°–450° F. for a sufficient time to develop a desirable light coloration but not long enough to produce a substantial browning or long enough to effect a crispness; removing said produce from said fatty composition; and subjecting the produce to the action of microwave energy to dehydrate said produce by internally heating the same sufficiently to render the product crisp without substantial change in color.

3. A process as defined in claim 1 wherein said microwave energy is applied at a frequency of 755–985 megacycles.

4. A process as defined in claim 1 wherein salt is applied to said chip products after they are removed from said fatty composition and before they are subjected to said microwave energy.

5. A process as defined in claim 1 wherein the time and intensity of subjecting said microwave energy to said chip products is sufficient to reduce the moisture content of said chip products from more than four percent to less than three percent, thereby rendering said chip products crisp.

6. A process as defined in claim 1 wherein said chip products are moved continuously through said fatty composition and through a station at which said microwave energy is applied.

7. A process in accordance with claim 1 wherein said chip products are cooked in said oil for a period of less than four minutes, said chip products being subsequently subjected to said microwave energy for a period of less than seven minutes.

References Cited

UNITED STATES PATENTS

| | | | |
|---|---|---|---|
| 3,056,877 | 10/1962 | Schmidt et al. | 210—47 |
| 3,127,494 | 3/1964 | Kellough et al. | 210—55 |
| 3,235,971 | 2/1966 | Tooby | 34—1 |
| 2,286,644 | 6/1942 | Pringle et al. | 99—100 |
| 2,611,705 | 9/1952 | Hendel | 99—100 |
| 3,044,880 | 7/1962 | Bogyo et al. | 99—100 |

OTHER REFERENCES

Siciliano et al., "Potato 'Nuts' A New Type of Snack," U.S.D.A. Agricultural Research Service, ARS–73–15, November 1956, pp. 1–3.

Talburt et al., "Potato Processing," 1959, The Avi Publishing Co., Inc., Westport, Conn., pp. 242, 243.

Copson, "Microwave Heating—In Freeze-Drying, Electronic Ovens and Other Applications," 1962, The Avi Publishing Company, Inc., Westport, Conn., pp. 373, 374, 375, 377, 378, 397, 398.

LIONEL M. SHAPIRO, *Primary Examiner.*

JOSEPH M. GOLIAN, A. LOUIS MONACELL,
*Examiners.*